United States Patent
Miyashita

(10) Patent No.: US 9,851,594 B2
(45) Date of Patent: Dec. 26, 2017

(54) DISPLAY DEVICE AND METHOD FOR MANUFACTURING THE SAME

(71) Applicant: Japan Display Inc., Tokyo (JP)

(72) Inventor: Kiyoshi Miyashita, Tokyo (JP)

(73) Assignee: Japan Display Inc., Tokyo (JP)

( * ) Notice: Subject to any disclaimer, the term of this patent is extended or adjusted under 35 U.S.C. 154(b) by 13 days.

(21) Appl. No.: 15/157,583

(22) Filed: May 18, 2016

(65) Prior Publication Data

US 2016/0370617 A1    Dec. 22, 2016

(30) Foreign Application Priority Data

Jun. 17, 2015 (JP) ................................ 2015-122205

(51) Int. Cl.
*G02F 1/13* (2006.01)
*G02F 1/1333* (2006.01)

(52) U.S. Cl.
CPC ................. *G02F 1/133308* (2013.01); *G02F 2001/133331* (2013.01); *G02F 2202/28* (2013.01)

(58) Field of Classification Search
CPC ... G02F 1/133308; G02F 2001/133331; G02F 2202/28
See application file for complete search history.

(56) References Cited

U.S. PATENT DOCUMENTS

| | | | | |
|---|---|---|---|---|
| 5,124,819 A * | 6/1992 | Davis | ................... | G01K 11/165 349/199 |
| 5,666,261 A * | 9/1997 | Aguilera | ................... | B32B 3/12 165/185 |
| 6,515,721 B2 * | 2/2003 | Jin | ..................... | G02F 1/133308 349/122 |
| 2001/0010569 A1 * | 8/2001 | Jin | ..................... | G02F 1/133308 349/58 |
| 2005/0117086 A1 * | 6/2005 | Sugahara | .......... | G02F 1/133308 349/58 |
| 2006/0098415 A1 * | 5/2006 | Kim | ......................... | H05K 5/02 361/740 |
| 2006/0238446 A1 * | 10/2006 | Takahashi | ............. | G06F 1/1601 345/55 |
| 2007/0054093 A1 * | 3/2007 | Sakurai | ..................... | B32B 7/06 428/156 |

FOREIGN PATENT DOCUMENTS

JP    2015-011179    1/2015

* cited by examiner

*Primary Examiner* — Adrian S Wilson
(74) *Attorney, Agent, or Firm* — K&L Gates LLP

(57) ABSTRACT

A display device according to an aspect of the present invention includes a cover member, a dam provided in a frame-like manner to a first surface of the cover member, an adhesion layer provided in a region surrounded by the dam, and a display panel bonded to the first surface with the adhesion layer interposed therebetween. A plurality of recesses depressed toward an outer circumference of the dam are provided on an inner circumference of the dam. The recesses are arranged side by side along the inner circumference of the dam.

6 Claims, 4 Drawing Sheets

DISPLAY DEVICE AND METHOD FOR MANUFACTURING THE SAME

CROSS-REFERENCE TO RELATED APPLICATIONS

This application claims priority from Japanese Application No. 2015-122205, filed on Jun. 17, 2015, the contents of which are incorporated by reference herein in its entirety.

BACKGROUND

1. Technical Field

The present disclosure relates to a display device and a method for manufacturing the same.

2. Description of the Related Art

Display devices are known in which a transparent cover member is bonded to a display surface of a display panel (refer, for example, to Japanese Patent Application Laid-open Publication No. 2015-011179). To bond the cover member to the display panel, a rectangular frame-like dam is first provided on a first surface of the cover member, and a liquid adhesive is discharged in dots into a region surrounded by the dam. Then, the display panel is pressed onto the first surface of the cover member under a reduced pressure environment so as to press to spread the adhesive arranged in a plurality of dots over the whole region surrounded by the dam. Then, the adhesive having spread over the whole region is hardened to form an adhesion layer so as to fix the display panel to the cover member.

The dots of adhesive concentrically spread from respective discharge positions thereof serving as centers of concentric circles, and overlap one another at middle points between adjacent ones of the discharge positions. Hence, discharging an excessive amount of the adhesive causes the overlapping adhesive to leak out over the dam. If the adhesive leaking out over the dam comes in contact with an adhesion layer of a polarizing plate, the adhesive force of the adhesion layer may decrease. If the amount of discharge of the adhesive is reduced to prevent the adhesive from leaking, the amount of adhesive becomes insufficient in portions where the dots of adhesive do not overlap on another, resulting in generation of bubbles.

SUMMARY

A display device according to an aspect of the present invention includes a cover member, a dam provided in a frame-like manner to a first surface of the cover member, an adhesion layer provided in a region surrounded by the dam, and a display panel bonded to the first surface with the adhesion layer interposed between the first surface and the display panel. A plurality of recesses depressed toward an outer circumference of the dam are provided on an inner circumference of the dam. The recesses are arranged side by side along the inner circumference of the dam.

A method for manufacturing a display device according to an aspect of the present invention includes a first step for forming a frame-like dam to a first surface of a cover member, a second step for discharging liquid adhesive into a plurality of discharge positions in a region surrounded by the dam, a third step for pressing a display panel onto the first surface under a reduced pressure environment so as to press to spread the adhesive discharged into the discharge positions over the whole region surrounded by the dam, and a fourth step for hardening the adhesive that has spread over the whole region surrounded by the dam to form an adhesion layer so as to fix the display panel to the cover member. A plurality of recesses depressed toward an outer circumference of the dam are provided on an inner circumference of the dam. The recesses are arranged side by side along the inner circumference of the dam. The recesses are provided in positions facing some of the discharge positions that are arranged side by side along the inner circumference of the dam.

DETAILED DESCRIPTION

Figure 1:
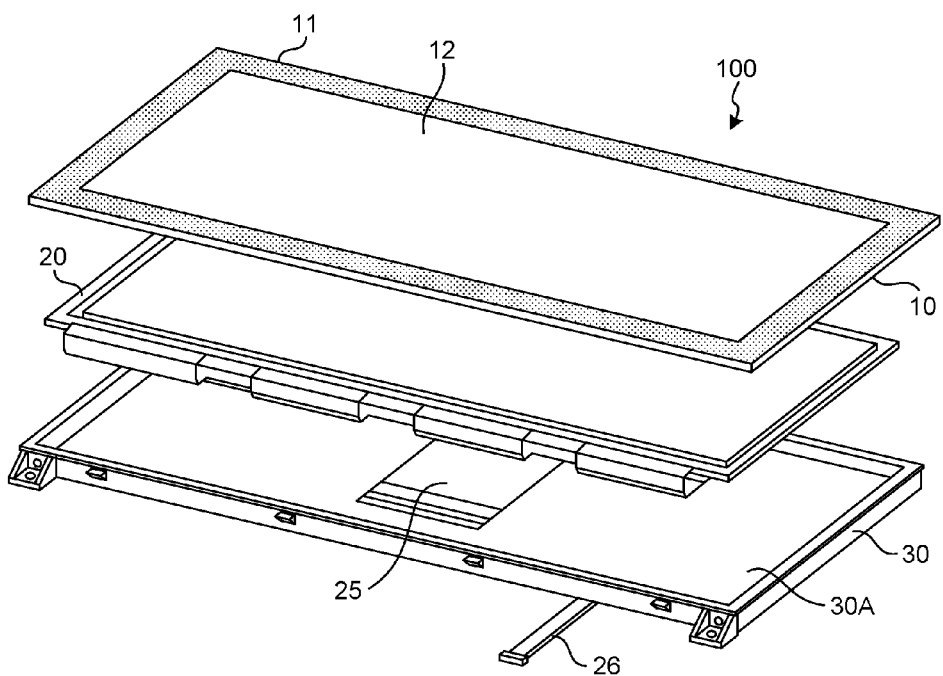
FIG. 1 is an exploded perspective view of a display device according to a first embodiment of the present invention.

Modes (embodiments) for carrying out the invention will be described in detail with reference to the drawings. The present invention is not limited to the description of the embodiments to be given below. Components to be described below include a component or components that is/are easily conceivable by those skilled in the art or substantially the same component or components. Moreover, the components to be described below can be appropriately combined. The disclosure is merely an example, and the present invention naturally encompasses an appropriate modification maintaining the gist of the invention that is easily conceivable by those skilled in the art. To further clarify the description, a width, a thickness, a shape, and the like of each component may be schematically illustrated in the drawings as compared with an actual aspect. However, the drawings are merely examples, and interpretation of the invention is not limited to the examples. The same element as that described in one of the drawings that has already been discussed is denoted by the same reference numeral through the description and the drawings, and detailed description thereof will not be repeated in some cases where appropriate.

First Embodiment

Figure 2:
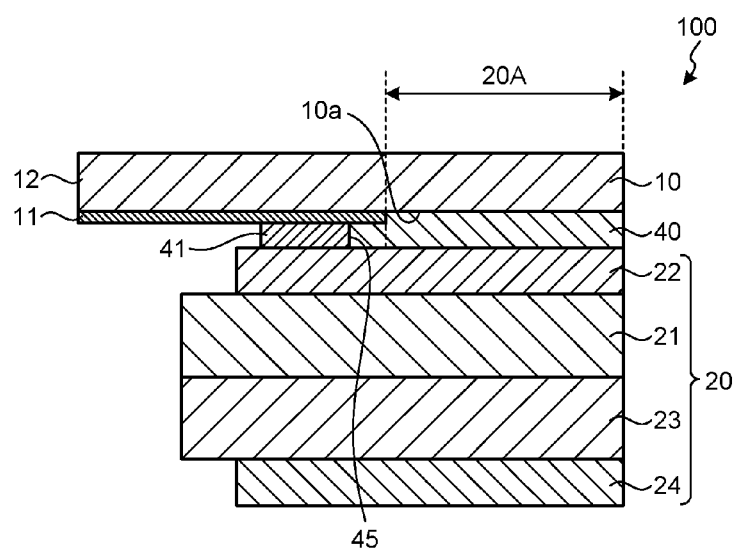
FIG. 2 is a sectional view of a part of the display device.

FIG. 1 is an exploded perspective view of a display device 100 according to a first embodiment of the present invention. FIG. 2 is a sectional view of a part of the display device 100.

The display device 100 includes a cover member 10, a display panel 20, and an accommodating case 30. The display panel 20 includes, for example, a first substrate 21, a second substrate 23, a first polarizing plate 22, and a second polarizing plate 24. For example, a liquid crystal layer is provided between the first and the second substrates 21 and 23. The first and the second polarizing plates 22 and 24 are bonded to the outer surfaces of the first and the second substrates 21 and 23, respectively. The central part of the display panel 20 serves as a display area 20A. The cover member 10 is bonded to a display surface (surface of the first polarizing plate 22) of the display panel 20, and, in this state, the display panel 20 is accommodated in the accommodating case 30.

The accommodating case 30 has an accommodating space 30A for accommodating the display panel 20. The accommodating space 30A accommodates the display panel 20 together with a backlight (not illustrated). The cover member 10 protects the display surface of the display panel 20 and serves as a cap member for closing the upper portion of the accommodating space 30A. Reference numerals 25 and 26 in FIG. 1 represent flexible printed circuit boards that are electrically coupled with the display panel 20 and the backlight, respectively.

The cover member 10 includes a light-transmitting base material 12 and a light-shielding layer 11 that absorbs visible light. The light-shielding layer 11 is provided in a position rimming the display area 20A of the display panel 20. The light-shielding layer 11 is formed into a rectangular frame shape along the outer circumference of the base material 12. A region surrounded by the light-shielding layer 11 serves as a light-transmitting portion for transmitting visible light. A surface on the light-shielding layer 11 side of the cover member 10 serves as a first surface 10a to which the display panel 20 is bonded. The display panel 20 is bonded to the first surface 10a with an adhesion layer 40 interposed therebetween. A dam 41 surrounding the outer circumference of the adhesion layer 40 is provided to the first surface 10a. The dam 41 is provided on the light-shielding layer 11.

Figure 3:
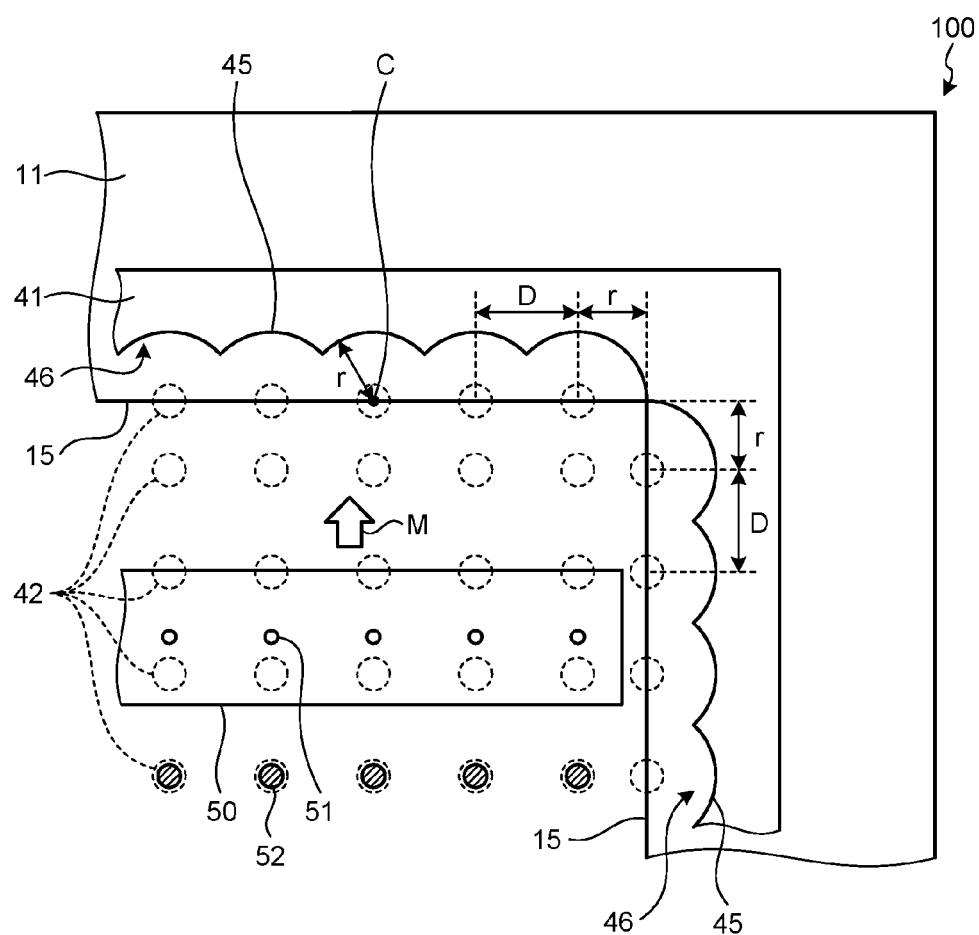
FIG. 3 is an enlarged plan view of a part of a dam.

FIG. 3 is an enlarged plan view of a part of the dam 41.

The dam 41 is provided in a frame-like manner to the first surface 10a of the cover member 10. The adhesion layer 40 is provided in a region surrounded by the dam 41. The dam 41 is formed along an inner circumference 15 of the light-shielding layer 11. An inner circumference 45 of the dam 41 is disposed outside (on the outer circumferential side of) the inner circumference 15 of the light-shielding layer 11. A plurality of recesses 46 depressed toward the outer circumference of the dam 41 are provided on the inner circumference 45 of the dam 41. Each of the recesses 46 has, for example, a shape having a width thereof decreasing from the inner circumferential side toward the outer circumferential side of the dam 41. The recesses 46 are arranged side by side along the inner circumference 45 of the dam 41.

In the present embodiment, the recesses 46 are arranged with adjacent ends thereof connected to one another. Each of the recesses 46 is formed into a circular arc shape. Radii r of the recesses 46 are equal to one another. A center C of each of the recesses 46 is provided on the inner circumference of the light-shielding layer 11. A distance D between the centers C of adjacent ones of the recesses 46 is smaller than a diameter 2r of each of the recesses 46. In the region surrounded by the dam 41, a plurality of discharge positions 42 into which an adhesive 52 is discharged are provided in a matrix parallel to the inner circumference 45 of the dam 41. Some of the discharge positions 42 that are arranged side by side along the inner circumference 45 of the dam 41 coincide with the positions of the centers C of the recesses 46.

To manufacture the display device 100 described above, the frame-like dam 41 is first formed to the first surface 10a of the cover member 10 (first step). The dam 41 is formed, for example, by screen printing.

Then, the liquid adhesive 52 is discharged into the discharge positions 42 in the region surrounded by the dam 41 (second step). At the second step, for example, a discharge head 50 having a plurality of nozzles 51 arranged side by side is disposed opposite to the first surface 10a, and is moved relative to the cover member 10 in a direction M intersecting the direction of arrangement of the nozzles 51 while discharging the adhesive 52 from the nozzles 51. This operation is continued until the adhesive 52 is discharged into all the discharge positions 42. The amounts of the adhesive 52 discharged into the discharge positions 42 are equal to one another.

Then, the display panel 20 is pressed onto the first surface 10a under a reduced pressure environment so as to press to spread the adhesive 52 discharged into the discharge positions 42 over the whole region surrounded by the dam 41 (third step). The discharged dots of adhesive 52 concentrically spread from the respective discharge positions 42 serving as centers of concentric circles. The dots of adhesive 52 overlap one another to form a liquid layer spreading over the whole region. The dots of adhesive 52 that are discharged along the inner circumference 45 of the dam 41 spread along the inner circumferences of the recesses 46. Excess amounts of the adhesive 52 are accommodated in the recesses 46, so that, when large amounts of the adhesive 52 are discharged, the adhesive 52 is kept from spreading out over the dam 41.

Then, the adhesive 52 (liquid layer) that has spread over the whole region surrounded by the dam 41 is hardened to form the adhesion layer 40 so as to fix the display panel 20 to the cover member 10 (fourth step). Thus, a bonding operation of bonding the display panel 20 to the cover member 10 is completed. After the completion of the bonding operation, the display panel 20 is accommodated in the accommodating space 30A together with the backlight. The rim of the cover member 10 overhanging out of the display panel 20 is bonded to the accommodating case 30.

In the display device 100 of the present embodiment described above, the recesses 46 are provided on the inner circumference of the dam 41. The adhesive 52 spreading toward the inner circumference 45 of the dam 41 is accommodated in the recesses 46, so that the adhesive 52 is kept from spreading out over the dam 41. Accordingly, sufficient amounts of the adhesive 52 can be discharged into the discharge positions 42, so that generation of bubbles is reduced.

Second Embodiment

Figure 4:
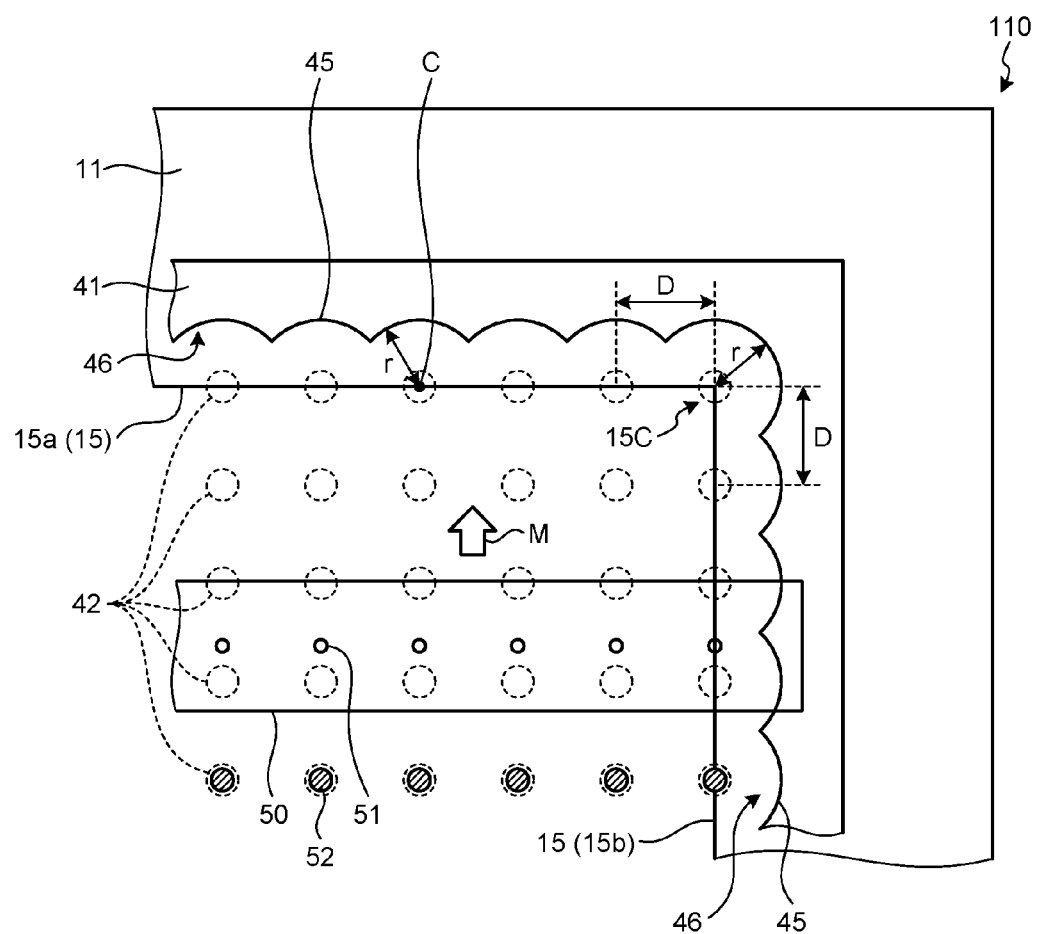
FIG. 4 is an enlarged plan view of a part of the dam according to a second embodiment of the present invention.

FIG. 4 is an enlarged plan view of a part of the dam 41 used in a display device 110 according to a second embodiment of the present invention. In the present embodiment, components common to those of the first embodiment are assigned with the same reference numerals, and the detailed description thereof will not be repeated.

The present embodiment differs from the first embodiment in that some of the recesses 46 of the dam 41 are provided on corner portions 15C of the inner circumference 15 of the light-shielding layer 11. Each of the corner portions 15C of the inner circumference 15 of the light-shielding layer 11 is provided with one of the recesses 46 spreading across two sides (first and second sides 15a and 15b) of the inner circumference 15 of the light-shielding layer 11 on both sides of the corner portion 15C. A radius r of the recess 46 provided on the corner portion 15C is equal to the radius r of the other recesses 46. The center C of the recess 46 provided on the corner portion 15C is located at the intersection of the two sides (first and second sides 15a and 15b). The distance D between the centers C of adjacent ones of the recesses 46 arranged along the first side 15a is equal to the distance D between the centers C of adjacent ones of the recesses 46 arranged along the second side 15b.

This configuration makes all the space intervals between the discharge positions 42 arranged in the direction orthogonal to the second side 15b equal to one another. As a result, the discharge head 50 with the nozzles 51 arranged at constant intervals can be used to simultaneously discharge the adhesive 52 into the discharge positions 42 on the second side 15b and into the other discharge positions 42.

Third Embodiment

Figure 5:
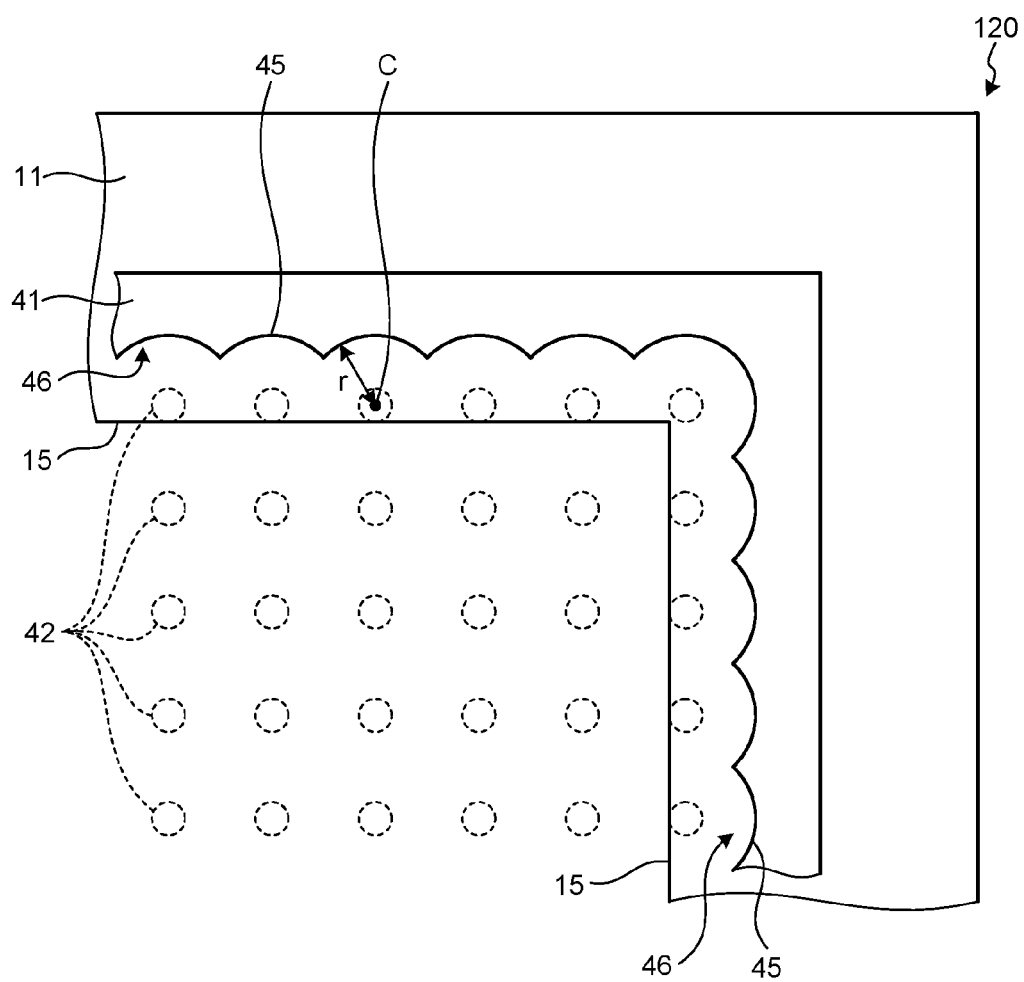
FIG. 5 is an enlarged plan view of a part of the dam according to a third embodiment of the present invention.

FIG. 5 is an enlarged plan view of a part of the dam 41 used in a display device 120 according to a third embodiment of the present invention. In the present embodiment, components common to those of the second embodiment are assigned with the same reference numerals, and the detailed description thereof will not be repeated.

The present embodiment differs from the second embodiment in that the centers C of the recesses 46 are provided in positions overlapping the light-shielding layer 11. In this configuration, some of the discharge positions 42 arranged side by side along the inner circumference 45 of the dam 41 are provided in the positions overlapping the light-shielding layer 11. An edge of the light-shielding layer 11 (step between the light-shielding layer 11 and the base material 12) does not lie between these discharge positions 42 and the recesses 46, so that the adhesive discharged on the light-shielding layer 11 uniformly spreads toward the recesses 46. Accordingly, the amounts of the adhesive are uniformized in the vicinity of the inner circumference 45 of the dam 41, so that the adhesive is kept from spreading out over the dam 41.

While the preferred embodiments of the present invention have been described above, the present invention is not limited to such embodiments. The description disclosed in the embodiments is merely an example, and various modifications can be made without departing from the gist of the present invention. Appropriate modifications made without departing from the gist of the present invention also naturally belong to the technical scope of the present invention. All inventions that can be carried out through appropriate modifications by those skilled in the art based on the invention described above also belong to the technical scope of the present invention, as long as the inventions include the gist of the present invention.

For example, while the embodiments described above have exemplified the circular arc shape as the shape of the recess 46, the shape of the recess 46 is not limited to this example. For example, a shape, such as an ellipse, a trapezoid, or a triangle, having a width thereof decreasing from the inner circumferential side toward the outer circumferential side of the dam 41 can be employed as the shape of the recess 46.

What is claimed is:

1. A display device comprising:
    a cover member;
    a dam provided in a frame-like manner to a first surface of the cover member;
    an adhesion layer provided in a region surrounded by the dam; and
    a display panel bonded to the first surface with the adhesion layer interposed between the first surface and the display panel, wherein
    a plurality of recesses depressed toward an outer circumference of the dam are provided on an inner circumference of the dam; and
    the recesses are arranged side by side along the inner circumference of the dam.

2. The display device according to claim 1, wherein the recesses are arranged to be connected to one another at adjacent ends of the recesses.

3. The display device according to claim 1, wherein each of the recesses is formed into a circular arc shape.

4. The display device according to claim 3, wherein radii of the recesses are equal to one another.

5. The display device according to claim 1, wherein
    the first surface is provided with a light-shielding layer in a position rimming a display area of the display panel; and
    the dam is provided on the light-shielding layer.

6. The display device according to claim 5, wherein
    the light-shielding layer is formed into a rectangular frame shape; and
    one of the recesses is provided on a corner portion of an inner circumference of the light-shielding layer so as to spread across two sides of the inner circumference of the light-shielding layer on both sides of the corner portion.

* * * * *